June 17, 1930.  H. J. MURRAY  1,764,335
RESILIENT SYNCHRONIZER
Filed Sept. 22, 1927
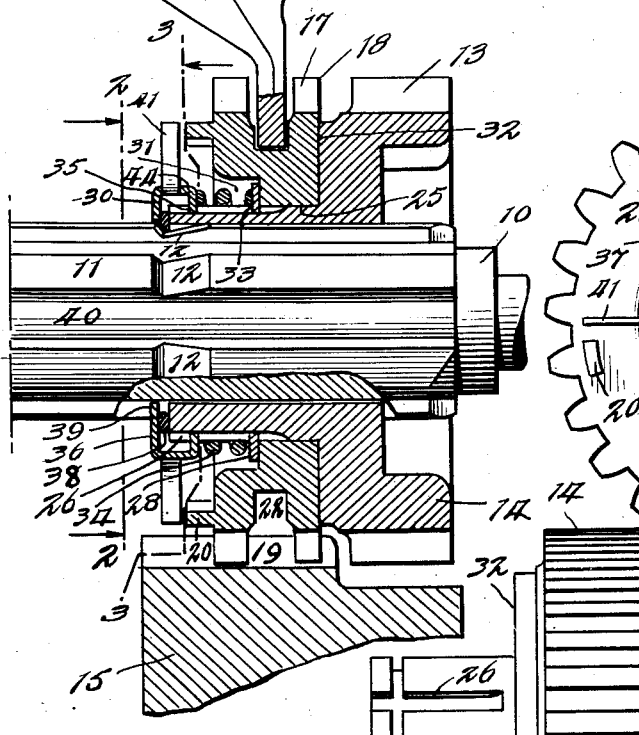
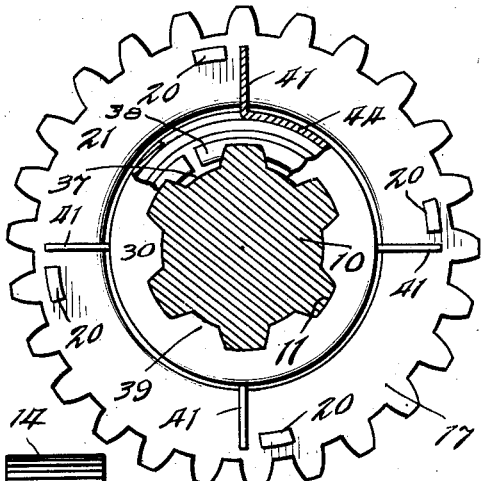
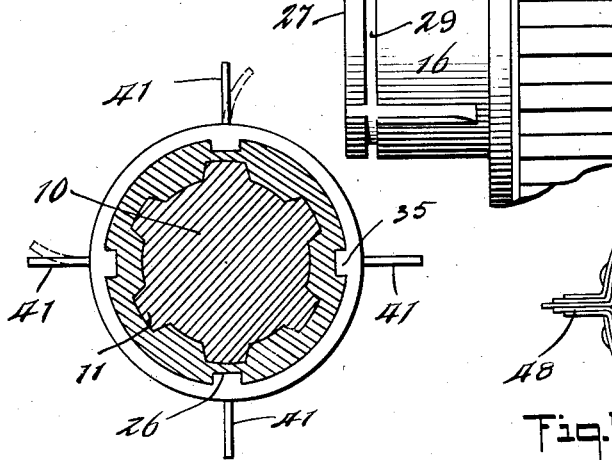
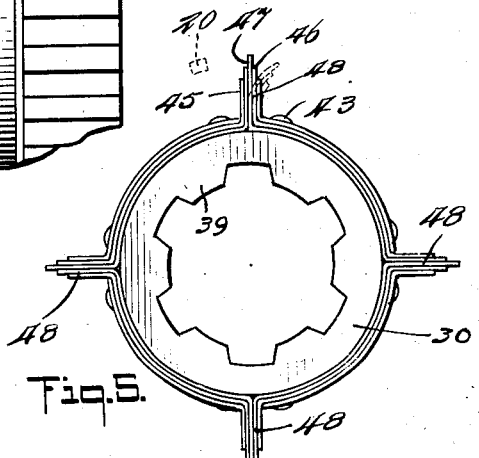
INVENTOR
HOWARD J. MURRAY
BY
ATTORNEY Patented June 17, 1930

1,764,335

UNITED STATES PATENT OFFICE

HOWARD J. MURRAY, OF BROOKLYN, NEW YORK

RESILIENT SYNCHRONIZER

Application filed September 22, 1927. Serial No. 221,392.

The invention relates in general to a variable speed power transmission mechanism of the gear shift type and in which a power driven gear or other form of rotor, and a load carrying gear or rotor are co-ordinated through the interposition of a clutch so that the gears or rotors will tend to assume a speed of rotation approximately equal to each other before they are moved into their intermesh or interdriving relation. More specifically defined the present invention relates to the clutch forming elements of such synchronizers, and to certain associated parts which provide a slip clutch driving connection between the parts to be synchronized.

The primary object of the invention is to provide in a synchronizing device of the class outlined, an extremely simplified and easily manufactured form of slip clutch driving connection.

In copending application, Ser. No. 648,235 filed March 30, 1922, there is disclosed an all-metal friction clutch between the relatively movable parts to be synchronized and which clutch utilizes a metal spring to provide a long wear surface which is disposed, when the clutch is in operative position, to interpose a retardance to the relative movement of the clutch elements and thus gradually bring the elements to a common speed. As was the case in this preceding application, one of the objects of the present invention is to provide a resilient metal faced resistance to the relative rotary movement of the clutch elements and to bring the same quickly but without noticeable jerk to the same speed.

In copending application, Serial No. 633,610, filed April 23, 1923, there is disclosed as part of the retardance clutch acting between the parts to be synchronized, a series of springs which intermittently impose by their distortion an intermittently acting resistance to the relative rotary movement between the clutch elements and thus tend to impose a series of resilient braking action on the same as long as one of the clutch members has a tendency to override the other. In the present invention as was the case in the invention disclosed in application 633,610, another object of the invention is to provide a simplified form of intermittently acting, slip clutch driving connection which will act through the resiliency of one or more springs to break the relative movement between the clutch elements.

Another object of the invention distinguishing from the showings in these prior applications is to provide a slip retardance between the clutch elements which will depend mainly on the resiliency of springs and only incidentally on friction in distinction from either a strictly frictional retardance or a retardance which is mainly frictional and only incidentally resilient.

Another object of the invention is to provide a synchronizing device in which the synchronizing force will be substantially independent of the manual effort necessary to dispose the clutch in operative position, and accordingly to provide a synchronizing device which can be shifted easily when the parts to be shifted are at any speed.

Among the other objects of the invention are to provide in a synchronizer of the friction clutch type an increase in mechanical advantage over synchronizers which contain conventional forms of flat face clutches, to increase the area of frictional contact engagement while restraining all-over dimensions, to minimize the tendency of the parts to lock when actuated, to increase the efficiency of the clutching contact while maintaining small size and compactness of the parts, to provide for synchronizing at widely varying speeds and to provide for an automatic restoration of the parts to their normal, inoperative positions after they have functioned to effect the desired synchronizing action.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Fig. 1 is a fragmentary view of parts of a gear drive of the type found in transmission casings of conventional form equipped with a preferred embodiment of the invention and showing the parts largely in vertical axial section;

Figs. 2 and 3 are transverse sectional views taken respectively on the lines 2—2 and 3—3 of Fig. 1, looking in the directions indicated by the arrows;

Fig. 4 is a detailed plan view showing the clutch ring locking slots at the left end of the sliding unit shown in Fig. 1, and Fig. 5 is a view in end elevation of a modified form of the clutch ring shown in Figs. 1 and 3.

In the drawings there is shown a power shaft 10 provided with longitudinal splines 11 in turn provided circumferentially with a line of beveled recesses 12. The shaft may be considered as a propeller shaft operatively connected to drive the traction wheels of an automobile. A sliding gear unit 13 is keyed to the shaft so as to rotate therewith and is provided integrally at one end with a power gear 14 designed to mesh with a power gear 15 keyed to another shaft (not shown) and which may be the jack shaft of a transmission gear set. In this disclosure it is assumed that it is desired to synchronize shaft 10 and gear 15, or differently expressed, to synchronize gears 14 and 15 to permit of their easy intermeshing without clash. The gear 14 is provided with a sleeve extension 16, hereinafter sometimes referred to as a bearing, and providing a mounting for an idler or synchronizer gear 17 which is mounted thereon for both rotary and a limited axial movement. The synchronizer gear is provided with teeth 18 and in the form of the invention illustrated it is intended but not necessary that these teeth at all times be in mesh with the teeth 19 on the power gear 15.

The side face of the gear 17 opposite the power gear 14 is provided with a plurality, and in the instant case four, of axially projecting fingers 20 hereinafter sometimes referred to as rigid synchronizing fingers or teeth. These teeth are designed to constitute the shiftable element of a slip clutch connection between the unit 13 and the gear 17. The teeth are disposed in a circle about the axis of the shaft and are of relatively short length considered circumferentially of the gear (as shown in Fig. 2) and are spaced apart equidistant providing a relatively long arcuate gap 21. The narrow teeth and long gap therebetween act to facilitate the interengagement of the teeth to form the slip clutch drive herein featured. The gear 17 is provided with a peripheral groove 22 in which works a shift fork 23 in turn manually actuated from a shift rod 24 and in this respect the disclosure follows conventional practices in gear shifting mechanism in automotive transmissions.

The portion of the bearing 16 outwardly of the cylindrical portion 25 on which the gear 17 normally rotates is provided with a series of slots particularly shown in Fig. 4. These slots include a plurality of parallel longitudinally extending slots 26 which extend from the end 27 of the bearing inwardly for a distance to properly locate against the retreated gear 17 a spring stop ring 28 hereinafter more fully described. The longitudinal slots 26 open into and are connected in spaced relation from the end 27 by an annular transversely extending groove 29 designed to coact with the grooves 26 to form a series of bayonet slot connections for demountably securing in place a ring or clutch element 30 hereinafter described.

The portion of the gear 17 which faces the ring 30 is undercut back of the teeth 20 to provide a recess 31 which will be made as deep as is possible in order to reduce the total length of the sliding unit 13 but not so deep as would affect the desired maximum possible length of bearing engagement between the gear 17 and the bearing 16 on which it is mounted. It is desirable in a device of this class to minimize as far as possible the area of wear surface between parts which must necessarily rotate and it is desirable particularly from the standpoint of economy in manufacturing costs to make the contacting surfaces flat. Accordingly the interengaging faces 32 between gears 14 and 17 are machined flat and perpendicular to the axis of the shaft 10. At the other side of the gear 17 there is positioned a thin metal wear plate ring or washer 28 which provides a flat bearing engagement against the adjacent side of the gear 17 and is contained within the recess 31. The plate 28 is secured to the bearing to turn therewith and for this purpose is provided with groove engaging fingers 33, which project from its inner periphery into the longitudinal slots 26. From this construction it is appreciated that the plate 28 may be slipped onto the bearing from the end 27 after the idler gear is in place. A resetting spring 34 is coiled about the grooved portion of the bearing 16 engages at one end against the plate 28 and at the opposite end against the ring 30 and this spring normally tends to move the clutch or to assist the shift fork in moving the clutch into the normal, inoperative, non-driving position shown in Fig. 1. As the plate 28 and ring 30 turn with the unit 13 and also carries with it the spring 34, it is seen that all parts except the gear 17 turn together and with the shaft 10, and that the spring and plate are disposed in an out-of-the-way position substantially within the outlines of the gear 17.

The ring 30 is most conveniently formed as a pressing punched from cylindrical stock with one end cut and turned inwardly to provide a flange cut to form a plurality of bayonet slot fingers 35 corresponding in number to the slots 26 in the bearing. This end of the pressing is formed and arranged so that the ring may be positioned on the sliding gear by moving the same inwardly with the fingers 35 engaging in the slots 26 and when the fingers reach the transverse slot 29 the ring may be rotated slightly about its axis thus providing a multiple bayonet slot connection between the ring and the bearing and in which position it is held against rotary movement by the shaft. The outer or left hand end of the clutch ring is similarly cut and bent inwardly to provide a flange 36 designed to lap the end 27 of the bearing and provide a space 37 to accommodate a split ring deterrent spring 38. This deterrent spring acts to restrain the freedom of sliding movement of the gear 14 on the shaft and thus provides a holding of the shiftable gear as the synchronizer gear 17 is shifted under the action of the fork 23 into its slip clutch connection with the fingers 41. The inner edge of the flange 36 is cut to provide a plurality of spline fingers 39 preferably one for each of the grooves 40 between adjacent splines 11 on the shaft. From this construction it is understood that when the ring is mounted in its bayonet slot connection with the bearing, it is rotated into position to align its spline fingers 39 with the spline containing grooves in the sliding unit so that when the shaft is inserted in place axially to provide a keyed engagement with the unit 13 it will at the same time lock the ring 30 against rotary movement. As this ring is the member which is most likely to wear or become damaged in the use of the device this construction permits of an easy way for removing the damaged or worn ring and the replacing of the same by a new part.

The ring 30 also constitutes the coacting element of the slip clutch connection herein featured and for this purpose is provided with a plurality of outwardly extending and circumferentially spaced apart springs 41 constituting resilient fingers. The fingers are secured at their inner end but their outer ends are free to be flexed when engaged by the synchronizing fingers 20 on the gear 17. The spring fingers 41 may be formed integral with the ring as shown in Figs. 1 and 2 or may be formed separate and secured conventionally to the ring as shown in Fig. 5 as by fasteners 43. In the showing in Fig. 2, the rim portion 44 of the ring is slit along parallel lines extending circumferentially of the ring to form tongues which are then bent outwardly at right angles as shown in Fig. 2 to form fingers of such length that they will be engaged or will engage the synchronizing fingers or teeth 20 as the clutch elements are rotated relative to each other.

Instead of the springs 41 being formed of a single thin leaf as shown in Fig. 2, it is suggested that they may be of a laminated form as shown at 45 in Fig. 5 and where this structure is utilized it is preferable to have the outer free ends stepped as shown at 46. In the showing in this figure the ends of the laminations are stepped down in both circumferential directions from the longest central spring 47. The parts are disposed so that the fingers 20 will engage the one or the other side of the longest spring depending on the direction of relative rotary movement, and be resisted successively by each of the shorter length springs and in this way prolong the time duration of contact and thus cushion the engagement between the teeth of the clutch.

Referring to the details of the spring construction shown in Fig. 5, it is noted that the laminated tooth structure is formed of thin strips of metal disposed one on the other, secured to the ring by rivets 43 and having opposite ends outbent and in sidewise abutting engagement to form the series of laminated spring fingers or resilient clutch teeth 48.

In operation and assuming that it is desired to cause the shaft 10 and gear 15 to approach the same speed before they are moved into intergeared relation by the meshing of gears 14 and 15, the shift rod 24 is moved from the position shown in Fig. 1 towards the left. It is understood that the resetting spring 34 is relatively weak and exerts no noticeable resistance to the manual shifting. Due to the thin edgewise presentation of the springs even when in the relatively wide laminated form shown in Fig. 5, and due to the relatively long gaps 21 between the fingers, little difficulty will be experienced in moving the synchronizing fingers 20 into the path of revolution of the resilient fingers 41 or 48 as the case may be. Should it so happen that at the instant of intermeshing the difference in torque developed by the relative rotary movement of the clutch element is insufficient to overcome the tension of the spring fingers there will be provided a positive, interdental, mechanical driving connection between the parts to be synchronized and the clutch will function as if both sets of teeth were rigid. Should this torque force be sufficiently high to overcome the resistance interposed by the spring teeth, the rigid synchronizing fingers will ride past the resilient fingers or teeth bending the latter out of their normal position as shown in dotted lines in Figs. 3 and 5. The spring pressed sliding contact between the clutch elements will exert a braking action on the relative rotary movement and each synchronizing tooth will move past one or more of the resilient teeth until the braking action has reduced the parts to approximately the same speed at which time the mechanical positive clutching engagement will be effected as previously described. During the period of time while the synchronizing fingers are in engagement with their coacting resilient fingers, two retarding actions will be taking place. As the teeth slide past each other, there will be a frictional engagement tending to resist the movement and the extent of this frictional resistance will, of course, be dependent upon the character of the interengaging surfaces, upon the length of the contracting engagement, upon the relative speed and upon the other factors which determine frictional resistance. At the same time the relative rotary movement is being resisted by the resilient action of the springs. In those cases where relatively high momentum of the parts to be synchronized must be neutralized, the springs are made relatively heavy and rigid, and where the forces to be neutralized are relatively weak or where it is permissible to prolong the time relation during which the parts are to be synchronized the springs are made relatively weak and easily flexed. It is suggested that in the showing in Fig. 5 the central spring 47 may be weak and that the succeeding shorter springs be progressively more rigid.

The idler gear 17 is stopped in its right to left movement into clutching position by the compression of the resetting spring and the parts are so designed that in the normal actuation of the shift rod the idler gear 17 and with it the power gear 15 are turning at or approximately the same speed as the power gear 14 by the time the gear 14 is brought into intermeshing engagement with the power gear 15. When in this driving relation, all of the parts are turning at the same speed and it is therefore immaterial whether the idler gear is restored to unclutched position. When it is desired to return the gear set to its neutral or unclutched position shown in Fig. 1, the shift rod is moved conventionally from left to right thus moving the clutch elements into their normal unclutched position and this movement is assisted by the resetting spring acting directly on the idler gear substantially in line with its inner peripheral portion which is sliding on the bearing.

By means of the device herein disclosed it is possible to provide an extremely efficient gear synchronizing device which will consist essentially of three parts, the sliding gear unit, the idler gear and the ring punching so that the cost of manufacture can be materially reduced over similar structures now known. As this structure requires a length only about one quarter of an inch increase over the conventional size of sliding units in automotive transmission mechanism, there is effected a saving in size as well as in the number of parts heretofore regarded as necessary in synchronizing devices of this character. The possibility of freezing or locking of the parts has been eliminated and perfect synchronizing has been attained almost instantaneously while the vehicle upon which the device is mounted is running not over twenty five miles per hour; and even at higher speeds the time delay in effecting the synchronizing is hardly noticeable. The idler gear is provided with standard teeth and has a wide bearing on the hub which contributes to the quietness with which this device operates. The only manual force required is that necessary to shift the idler gear and compress the resetting spring and this manual force will be the same for all speeds.

I claim:

1. A synchronizing device comprising a sliding gear unit mounted for rotary movement, a ring demountably secured to one end thereof and provided with outstanding springs having their outer ends free to be flexed and constituting the teeth of an interdental slip clutch drive, a synchronizer gear mounted for rotary and axial movement on the unit and provided on the side thereof facing the ring with rigid teeth constituting the coacting element of the clutch drive and movable axially into the path of movement of the spring teeth and engaging the same adjacent their outer ends, said synchronizer gear provided with a peripheral groove and a shift fork in said groove acting through the synchronizer gear for shifting the clutch into and out of its clutching position and for bodily shifting the unit as a whole.

2. In a synchronizing device, the combination of two power members adapted to be moved into interdriving relation, synchronizing means for causing said members to approach the same speed, said means including two clutch elements coacting to form an interdental tooth clutch with the teeth of one of its elements formed of springs to provide resilient retardation between the clutch elements when the relative rotary torque between the elements is in excess of the resistance to relative rotation imposed on the clutch by its spring teeth, one of said clutch elements connected to turn with one of the power elements and the other clutch element connected to turn with the other power element, and said springs constituting the primary means for retarding the relative rotary movement between the members to be synchronized.

3. A synchronizing device composed essentially of three parts, a sliding gear unit provided with means for mounting the same on a spline shaft, an idler gear journalled on the unit and provided with means for receiving a shift fork and with an element of a clutch formed of a plurality of spaced apart fingers projecting from one side thereof axially of the shaft, and a coacting clutch element secured to the unit and having resilient members disposed in the path of the axial movement of the clutch element on the idler gear, said elements having a limited freedom of relative circumferential movement coacting to provide a resilient slip clutch and said elements adapted to be moved into an interengaged slip clutching position by the shifting of the idler gear axially on the unit.

4. In a device of the class described, the combination of a spline shaft, a sliding gear unit engaging the splines on said shaft, a ring pressing keyed to said unit to slide axially therewith and keyed to said shaft to rotate therewith, said pressing provided with a laterally extending spring, an idler gear mounted for rotary movement on said unit and provided on the side adjacent the pressing with an axially extending finger and a shift fork engaging the idler gear to shift the finger into and from the path of revolution of the spring.

5. A synchronizing device comprising a bearing mounted for rotary movement, an idler gear mounted for rotary and axial movement on said bearing, a ring provided with a spring lapping the side of the idler gear and secured to the bearing at one side of the idler gear, said idler gear provided with a finger adapted to be moved axially with the idler gear to dispose said finger in the path of movement of the spring.

6. In a device of the class described, the combination of a bearing mounted for rotary movement, a ring secured to the bearing to turn therewith, said ring provided with a plurality of radially extending and circumferentially spaced apart spring fingers, and a member mounted for rotary movement on the bearing and provided with a plurality of fingers adapted to be disposed in the plane of revolution of the spring fingers and coacting therewith to provide a multiple tooth slip clutch connection between the bearing and the member.

7. In a device of the class described, the combination of a bearing mounted for rotary movement and provided at one end with a gear, a second gear mounted on the bearing for rotary and axial movement, synchronizing means including a clutch for causing the gears to approach the same speed, means secured to the bearing to turn therewith and provided with an element of said clutch and a spring between said means and the second gear tending to shift the second gear axially and move the synchronizing means into an inoperative position.

8. In a device of the class described, the combination of a shaft, a sliding gear unit splined to said shaft, a mounting member having a splined connection with both the shaft and sliding gear to rotate therewith, an outstanding spring finger secured at its inner end to said member, a synchronizing gear journalled for rotary and axial movement on said unit and provided with a rigid finger for engaging the spring finger adjacent its outer, free end to provide a slip clutch connection between the unit and gear.

9. A synchronizing device comprising a unit, a synchronizer mounted for rotary and axial movement on the unit, a clutch between the synchronizer and unit comprising a finger extending radially from the unit and a coacting finger extending axially from the synchronizer, one of said fingers being resilient and adapted to be bent into an inoperative, non-clutching position by the other finger, and control means acting on the synchronizer to shift the same axially to bring its finger into the path of revolution of the finger on the gear unit thereby to provide at will a slip clutch connection between the unit and synchronizer.

10. A synchronizing device comprising a gear unit provided with a hub, having a power gear at one end, a ring secured to the other end and providing a bearing therebetween, an idler gear journalled on said bearing, said idler gear and ring provided with dental means coacting to form a slip clutch connection between the gear unit and idler gear when said means are in intermeshed relation, and a spring between the ring and idler gear tending to force the idler gear towards the power gear and to move the clutch into an inoperative position.

11. A synchronizing device comprising a unit mounted for rotary movement and provided with an element of a clutch, a member mounted on the unit for axial and rotary movement and provided with a coacting clutch element, one of said elements provided with teeth in the form of a set of thin banked springs of different strengths and coacting with the other element to provide resilient retardation between the unit and member when the elements are in clutching relation.

12. A synchronizing device comprising a unit mounted for rotary movement and provided with a set of radially extending, thin, leaf springs extending in a plane passing through the axis of rotation of the unit, a member mounted for rotary and axial movement on the unit and provided with a tooth adapted to be moved into the plane of revolution of the set of springs when the member is shifted axially, said tooth and spring set coacting to form a slip clutch connection between the unit and member.

13. A synchronizing device including an interdental clutch with both elements thereof mounted for rotary movement about a common axis, one element including a plurality of radially extending and circumferentially spaced laminated springs with the laminations disposed circumferentially and with their outer ends stepped from each other, the other element provided with teeth adapted to intermesh with said springs, and means for moving said clutch elements to and from their intermeshing relation.

14. A synchronizing device including an interdental clutch with both elements thereof mounted for rotary movement about a common axis, one element including a plurality of radially extending and circumferentially spaced apart long springs with their outer ends free to bend, backing springs tending to resist the bending of the inner ends of said long springs, the other element provided with teeth adapted to intermesh with said springs, and means for moving said clutch elements to and from their intermeshing relation.

15. A synchronizing device comprising two relatively rotatable members each provided with an element of a tooth clutch and adapted to coact to provide an interdental slip clutch, a set of thin leaf laminated springs constituting one of the teeth of the clutch and adapted to be disposed in the path of movement of a coacting tooth and means for shifting the elements to and from their interdriving relation.

16. The combination of two members adapted to drive one from the other, one of said members being a shaft and the other a power gear, synchronizing means for causing said members to approach the same speed, said means including a sliding unit keyed to the shaft and provided at one end with an intermediate gear adapted to be moved into meshing engagement with the power gear and provided at its other end with a clutch element, a synchronizer gear journalled for rotary movement on the unit between the clutch element and the intermediate gear and at all times in mesh with the power gear, said synchronizer gear provided with a clutch element coacting with the element at the end of the unit to provide a slip clutch driving connection between the unit and the synchronizer gear, the side of the synchronizer gear adjacent the driving connection being undercut and a spring disposed in an out-of-the way position in said undercut and bearing between the unit and synchronizer gear to force the clutch elements into an inoperative, unclutched relation.

17. In a device of the class described, the combination of a spline shaft, a sliding gear unit mounted on the shaft to turn therewith, said unit provided at one end with a longitudinal groove extending inwardly from said end, and a circumferentially extending groove opening into the same, a ring at said end provided with means for engaging the splines on the shaft and provided with a bayonet finger adapted to move into the longitudinal slot and be rotated into the circumferential slot thereby to secure the ring to the gear unit by a bayonet slot connection.

18. In a device of the class described, the combination of means providing a bearing mounted for rotary movement, said bearing provided at one end with a longitudinal groove extending inwardly from said end and a circumferentially extending groove opening into the longitudinal groove and spaced from said end, a spring stop ring slidable axially on said bearing and keyed to the longitudinal groove to turn with the bearing, a spring stop ring at the end of the bearing and having a bayonet slot connection with the circumferential groove, and turning with the bearing, a synchronizer gear mounted for rotary movement on said bearing and having a limited axial movement thereon to and from an operative position and a spring coiled about the bearing with one end engaging the stop ring and the other end engaging the sliding stop ring and acting therethrough to force the sliding synchronizer gear in one direction on the bearing.

19. In a device of the class described, the combination of a splined shaft, a bearing keyed to the shaft, a gear mounted for rotary movement on the bearing, means for causing the shaft and gear to approach a common speed, said means including a ring carried by the bearing, and a slip-clutch connection between the gear and ring, the splines on said shaft acting on the ring to lock the ring from rotary movement on the bearing.

20. In a device of the class described, the combination of a spline shaft provided with deterrent recesses, a gear unit keyed to said shaft and slidable thereon, a ring demountably secured to said unit at one end thereof and provided with a finger entering into one of the grooves between the splines on the shaft and spaced from the adjacent end of the unit, and a deterrent split spring positioned in the space between said finger and the adjacent end of the unit, and adapted to be disposed in the recesses to restrain the freedom of sliding movement of the unit on the shaft.

21. In a device of the class described, the combination of a gear unit mounted for rotary movement and provided with a bearing, a synchronizer gear mounted on said bearing for both rotary and axial movement, means between the synchronizer gear and gear unit providing a clutch connection, a spring between the synchronizer gear and the gear unit tending to shift the synchronizer gear axially into position to intercept the driving connection through the clutch, and spring stops at opposite ends of the spring and keyed to the bearing to rotate therewith, the contacting faces between the synchronizer gear and the adjacent spring stop being flat.

22. In a device of the class described, the combination of a gear unit mounted for rotary movement, an idler gear mounted thereon for rotary and axial movement, synchronizing means operable on an axis movement of the idler gear from its normal, inoperative position into an operative position for causing the speed of one to approach the speed of the other, a spring tending to shift the idler gear and restore the same into its normal inoperative, non-synchronizing position, and a disk ring keyed to the gear unit to turn therewith, disposed between the spring and idler gear and providing a flat wearing surface engagement with the idler gear.

23. In a synchronizer, the combination of two members mounted for independent rotary movement about a common axis of rotation and having relative axial movement, clutching means adapted to provide a driving connection between said members, control means for shifting the clutching means to and from its clutching position, said clutching means including a plurality of radially extending resilient clutch elements and a corresponding number of coacting rigid clutch elements adapted to be shifted axially into the path of rotation of the resilient clutch elements and having a circumferential length materially less than the distance between adjacent resilient elements coacting to provide a one-to-one drive up to a predetermined load transmitted through the clutching means when the members are turning substantially at the same speed and said clutch elements operatively controlled by the relative speed of the members for releasing said one-to-one driving connection between the members and substituting an intermittent relative retardation when the torque force is sufficient to overcome the resistance of said resilient clutch elements.

Signed at New York, in the county of New York, and State of New York, this 20th day of September, A. D. 1927.

HOWARD J. MURRAY.